July 7, 1925.

C. H. HAPGOOD 1,544,747

APPARATUS FOR SEPARATING WAX FROM MINERAL OIL LUBRICATING STOCK

Original Filed Oct. 22, 1921   2 Sheets-Sheet 1

WITNESS:

INVENTOR
Cyrus Howard Hapgood
BY
ATTORNEY.

Patented July 7, 1925.

1,544,747

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

APPARATUS FOR SEPARATING WAX FROM MINERAL-OIL LUBRICATING STOCK.

Original application filed October 22, 1921, Serial No. 509,669. Divided and this application filed October 11, 1922. Serial No. 593,674.

*To all whom it may concern:*

Be it known that I, CYRUS HOWARD HAPGOOD, a citizen of the United States, residing at Nutley, county of Essex, and State of New Jersey, have invented a new and useful Improvement in Apparatus for Separating Wax from Mineral-Oil Lubricating Stock, of which the following is a full, clear, and exact description, reference being had to the accompanying drawings, which form a part of this specification.

In the refining of paraffin base crude oil, it is customary to distill off successively products of successively higher boiling points, such as naphtha, illuminating oil, gas oil and wax distillates, leaving as a residue what is commonly known as cylinder stock or bright stock. This bright stock carries in solution a substantial proportion of amorphous wax (petrolatum) which it is necessary or desirable to separate from the oil. The wax distillates carry in solution a substantial proportion of crystalline wax (paraffin) which it is necessary or desirable to separate from the oil.

It is known to effect the separation of wax from bright stock by diluting the stock with naphtha, bringing the blended stock in heat exchange relation with refrigerated brine for the purpose of throwing the wax out of solution, then separating the wax from the oil by filtration or settlement, and distilling off the naphtha.

It is also known to effect the separation of wax from wax distillates by similarly cooling with refrigerated brine followed by filtration or settlement.

The settlement and filtration processes are bulk processes, involving the use of large plants occupying much room, the handling of a large amount of stock at one time and the expenditure of considerable time. An expensive part of the plant is that required to provide refrigerated brine in quantity sufficient to cool and maintain cold the bright stock or wax distillate; while the "cold" carried by the oil after the separation therefrom of the wax is largely or wholly wasted. The refrigerating part of the plant is therefore both expensive and uneconomic.

The object of this invention is to carry on the process continuously instead of in batch, to substitute a small, efficient and economical plant for a large, inefficient and wasteful plant, and particularly to simplify and cheapen the refrigerating treatment. In effecting this result I avail myself of known expedients, such as heat (or "cold") exchange, chilling by direct absorption of heat by ammonia, and centrifugation, all combined to form a process which is unitarily new.

I am aware that it has been proposed to separate wax from cylinder stock continuously by refrigerating the stock and separating the oil and the precipitated waxes by means of centrifugal force, using brine as an agent to carry the wax out of the centrifugal bowl. This process is effective to separate the oil from the wax, but the resultant mixture of brine and wax is difficult of separation. My process does not necessarily involve, but preferably excludes, the use of cold brine to carry the wax out of the centrifugal bowl. In any case, neither of the centrifugal processes herein described is herein claimed per se, but only as a step in combination with the preceding refrigerating treatments and other associated steps.

My treatment of bright stock and my treatment of wax distillates have certain features in common and these features, when associated as herein described, comprise my invention in its broader aspect. In view, however, of the differences between the two treatments, I shall describe each separately.

Referring now to the accompanying drawings, in which I have illustrated a preferred embodiment of my invention:

Figure 1:
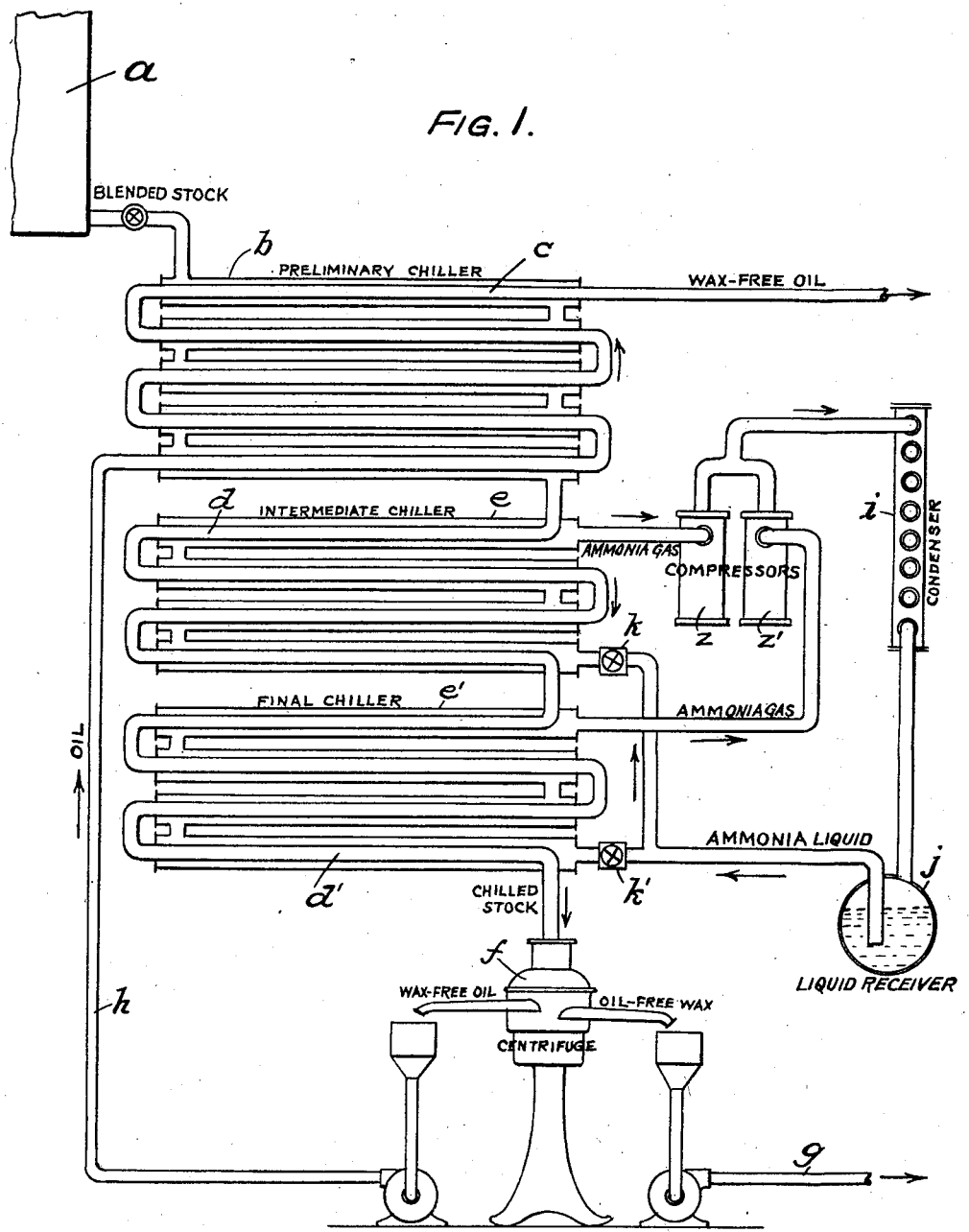
Fig. 1 is a diagram of an apparatus arranged to carry out my process as adapted to the separation of amorphous wax (petrolatum) from bright stock.

Referring first to Fig. 1: $a$ is a tank containing bright stock with wax in solution and diluted with naphtha. This tank is connected with a double pipe preliminary chiller comprising a pipe $b$ adapted to convey the blended stock toward the final chiller or chillers, and a pipe $c$ (in heat exchange relation with pipe $b$) adapted to convey the separated cold wax-free oil toward a still for driving off the naphtha. The blended stock and the wax-free oil flow in opposite directions so that the stock gradually loses heat while the oil is gradually heated to normal temperature. It may be assumed, for purposes of illustration, that the temperature of the stock is reduced in this chiller from (say) 90° F. to 45° F.

The preliminary chilled blended stock then flows through an intermediate double pipe chiller comprising a pipe $d$ adapted to convey the stock to the final chiller and a pipe $e$ (in heat exchange relation with pipe $d$) adapted to circulate ammonia which has been compressed, condensed and expanded in the manner well known in the art and known as the "direct expansion" system of refrigeration. The current of expanded, gaseous, low-temperature ammonia flows in a direction opposite to that of the stock and gradually reduces the temperature thereof until, when the blended stock emerges from the pipe $d$, it has been substantially reduced in temperature, say to about 20° F.

The thus chilled blended stock then flows through a final double pipe chiller comprising a pipe $d'$ adapted to convey the stock to a centrifugal separator and a pipe $e'$ (in heat exchange relation with pipe $d'$) adapted to circulate ammonia which has been compressed, condensed and expanded. The current of ammonia flows in a direction opposite to that of the stock and gradually reduces the temperature thereof until when the blended stock emerges from the final cooler it has been reduced to a temperature sufficient to throw all the wax out of solution. This final temperature may vary from —10° F. to 10° F. A preferred temperature is somewhat below zero F.

In the separator $f$ (which may be of the type shown in the Snyder Patent No. 1,283,343, dated October 29, 1918), the oil and wax are separated and separately discharged, the wax being pumped through the pipe $g$ to a still for separating and recovering the naphtha and the oil being pumped through the pipe $h$ and through pipe $c$ of the double pipe chiller, to a still in which the naptha is driven off.

In the ammonia circulating system, $i$ is the condenser, wherein the compressed ammonia at a high pressure is reduced in temperature. $j$ is the ammonia reservoir. The ammonia pipes $e$ and $e'$ of the last two chillers are arranged in "parallel". The two pipes have independent expansion valves $k$ and $k'$, the ammonia, as it escapes through either valve, being greatly reduced in pressure and expanding from a liquid of relatively high temperature to a gas of very low temperature, as well known in the art. From the pipes $e$ and $e'$ the ammonia gas, which has absorbed heat from the stock, flows to the respective compressors $z$, $z'$, wherein the ammonia is compressed and greatly elevated in temperature, preparatory to condensation in condenser $i$, as before described.

It will be noted that the execution of the above process involves the use of a small and inexpensive plant; that while a small amount of stock is handled at one time, the process is continuous and that a large volume of stock may be treated in a comparatively short time; and that the utmost economy in cost of operation is achieved. With respect to the last named advantage, it is clear that the lowering of the temperature of the incoming blended stock by heat absorption by the outgoing centrifugally separated oil is effected by means of a liquid that has been already necessarily refrigerated; that the expense of refrigeration is only that required to reduce the temperature of the stock through a comparatively small temperature range; and that the later chilling is effected by direct expansion of ammonia and not by means of an ammonia-refrigerated intermediate liquid.

Figure 2:
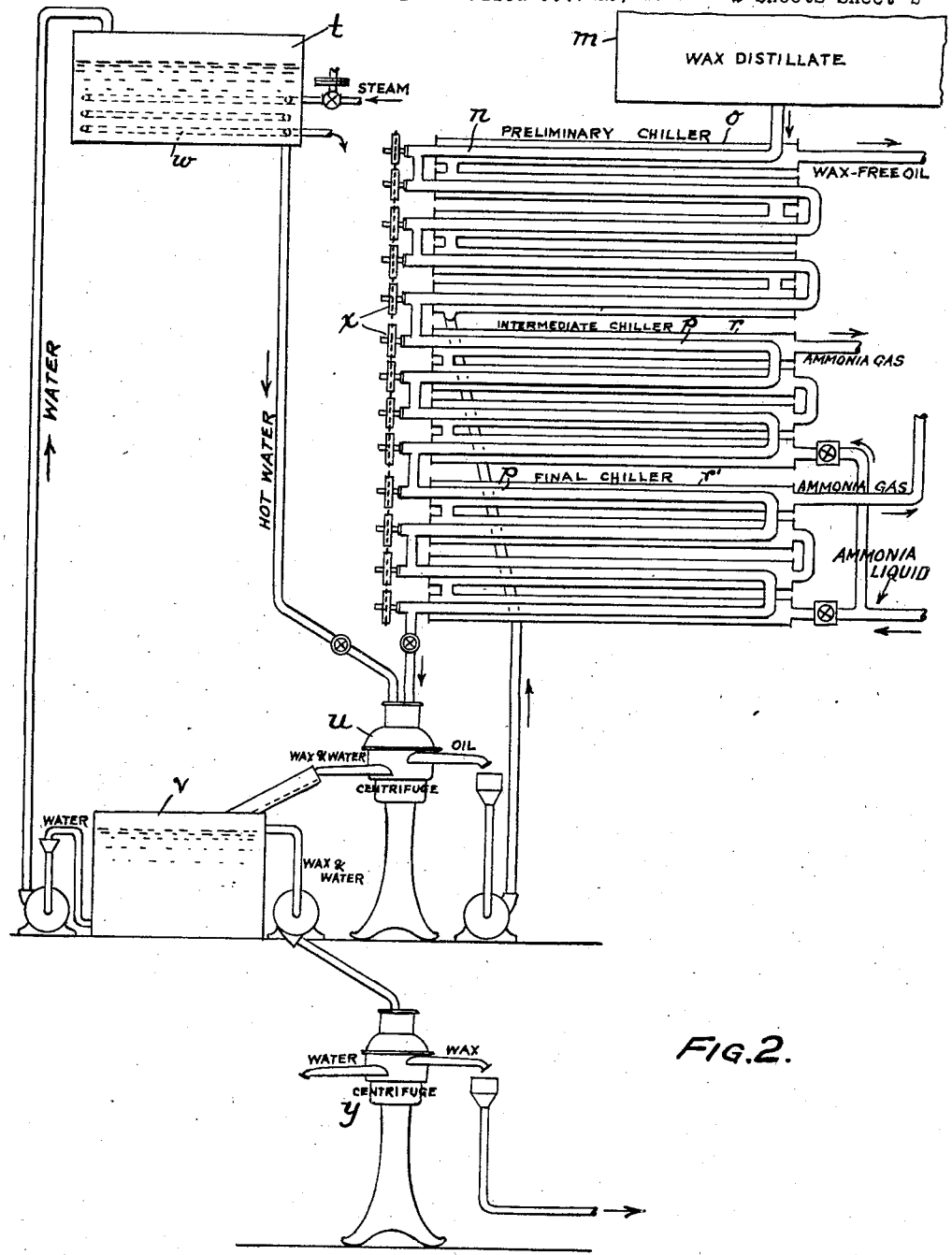
Fig. 2 is a diagram of an apparatus arranged to carry out my process as adapted to the separation of crystalline wax (paraffin) from wax distillates.

Referring to Fig. 2, which is an apparatus for the treatment of wax distillates; $m$ is a tank containing a wax distillate. This distillate need not be, and preferably is not, diluted with naphtha. The tank $m$ is connected with a double pipe preliminary chiller comprising a pipe $n$ adapted to carry the distillate toward the final chiller, and a pipe $o$ (in heat exchange relation with pipe $n$ through which the separated cold wax-free oil travels on its way to storage.

The preliminary chilled stock then flows through one or more double pipe chillers $r$, $r'$ forming part of a "direct expansion" ammonia refrigerating system the same as that diagrammed in Fig. 1. The distillate emerges from the final cooler reduced to a temperature of from 20° F. to 35° F., preferably about 25° F. At this temperature the crystalline waxes have been thrown out of solution.

It is more difficult to centrifugally separate from oil and discharge from the bowl crystalline wax than it is to separate and discharge amorphous wax. If no heavy liquid agent is added to sludge the wax out of the bowl, no wax at all will be discharged from the bowl unless, in the first instance, the distillate has been diluted with naphtha. Even the use of a sludging liquid, such as refrigerated brine, will not prevent the wax from building up rapidly within the bowl, and moreover the mixture of brine and wax is very difficult of separation. In the present process, I admit water, at a temperature of about 180° F., from a reservoir $t$, into the peripheral part of the separator bowl $u$, heat-insulating the water feed channel within the bowl from the distillate feed, channel and from the separating compartment. The hot water flowing along the periphery of the bowl melts the layer of wax immediately adjacent thereto, and such wax, being in a liquid condition, readily flows out of the bowl. This part of the process is not herein claimed per se, as it is the joint invention of Selden H. Hall and myself and forms the subject-matter of an application filed September 8, 1921, Serial No. 499,325.

The separated cold wax-free oil from the centrifugal separator *u* is then pumped through the pipe *o* of the double pipe preliminary chiller and thence to storage. The melted wax and hot water discharge into a separator *v* constructed on the principle of a Florence flask, in which the water (which is heavier than the wax) is continuously siphoned off and thence pumped back to the tank *t*, while the waxes float off the top and are either pumped direct to the sweating pans or may be freed from any water which they carry off by treatment in a second centrifugal separator *y*.

The water in tank *t* is kept at the desired temperature by means of steam coils *w*. The pipes in the coolers through which the distillate flows to the centrifuge are prevented from clogging with wax by means of internal agitators on shafts to which are secured driven sprockets *x*.

It will be evident that the just described process for treating wax distillates and the previously described process for treating bright stock have features both of identity and similarity, and that to the extent that the processes are alike, the advantages are the same.

While that step of the refrigerating treatment comprising the cooling of the stock by direct expansion of ammonia may be carried out in a single chiller instead of in a plurality of chillers, as illustrated and described, I have found that the power required (measured in terms of H. P. hours to make one ton of refrigeration) will diminish with the number of chillers employed. The use of at least a plurality of chillers is therefore not a mere matter of convenience, or a mere duplication, but effects a substantial saving in cost of refrigeration.

I have not herein claimed the process disclosed, as the same forms the subject-matter of an application filed by me October 22, 1921, Serial No. 509,669 matured into Patent No. 1,464,707 of which this application is a division.

Having now fully described my invention, what I claim and desire to protect by Letters Patent is:

1. An apparatus for treating lubricating oils containing waxes in solution to continuously separate the wax from the oil, comprising a preliminary double pipe chiller and a final double pipe chiller, said chillers comprising a continuous conduit through which the solution of oil and wax is adapted to continuously flow, each of said chillers comprising also a second conduit arranged in heat exchange relation with the first conduit and through which the chilling fluid is passed, and a centrifuge communicating with said first conduit and into which the refrigerated stock is adapted to continuously feed, said centrifuge having a discharge for wax-free oil communicating with the second conduit of the preliminary chiller.

2. An apparatus for treating lubricating oils containing waxes in solution to continuously separate the wax from the oil, comprising a preliminary chiller and a multi-stage chiller, said chillers comprising a continuous conduit through which the solution of oil and wax is adapted to continuously flow, each of said chillers comprising also a second conduit arranged in heat exchange relation with the first conduit and through which the chilling fluid is passed, the said second conduits of the different stages of the multi-stage chiller being arranged in parallel, a centrifuge communicating with said first conduit and into which the refrigerated stock is adapted to continuously feed, said centrifuge having a discharge for wax-free oil communicating with the second conduit of the preliminary chiller, and means to circulate a refrigerating fluid through the said second conduits of the multi-stage chiller.

3. An apparatus for treating lubricating oils containing waxes in solution to continuously separate the wax from the oil, comprising a preliminary double pipe chiller, an intermediate double pipe chiller and a final double pipe chiller, said chillers comprising a continuous conduit through which the solution of oil and wax is adapted to continuously flow, each of said chillers comprising also a second conduit arranged in heat exchange relation with the first conduit and through which the chilling fluid is passed, the second conduits of said intermediate and final chiller being arranged in parallel, a centrifuge communicating with said first conduit and into which the refrigerated stock is adapted to continuously feed, said centrifuge having a discharge for wax-free oil communicating with the second conduit of the preliminary chiller, a container for liquid ammonia, connections from the ammonia container to the intermediate and final chillers respectively, expansion means in said connections, and means to compress and condense the ammonia leaving the intermediate and final chillers.

4. An apparatus for treating lubricating oil stock containing waxes in solution to continuously separate the wax from the oil, comprising a continuous conduit through which the stock is adapted to continuously flow, a centrifuge communicating with said conduit and into which the chilled stock is adapted to continuously feed, said centrifuge having a discharge for oil-free wax and a discharge for chilled wax-free oil, a second conduit communicating with the second of said discharges and in heat exchange relation with the fore part of said first conduit, a third conduit in heat exchange relation with that part of the first conduit between the second conduit and the centrifuge, and means independent of said centrifuge discharges to supply refrigerating fluid to the third conduit.

In testimony of which invention, I have hereunto set my hand, at New York, on this 12th day of September, 1922.

CYRUS HOWARD HAPGOOD.